Figure 1:
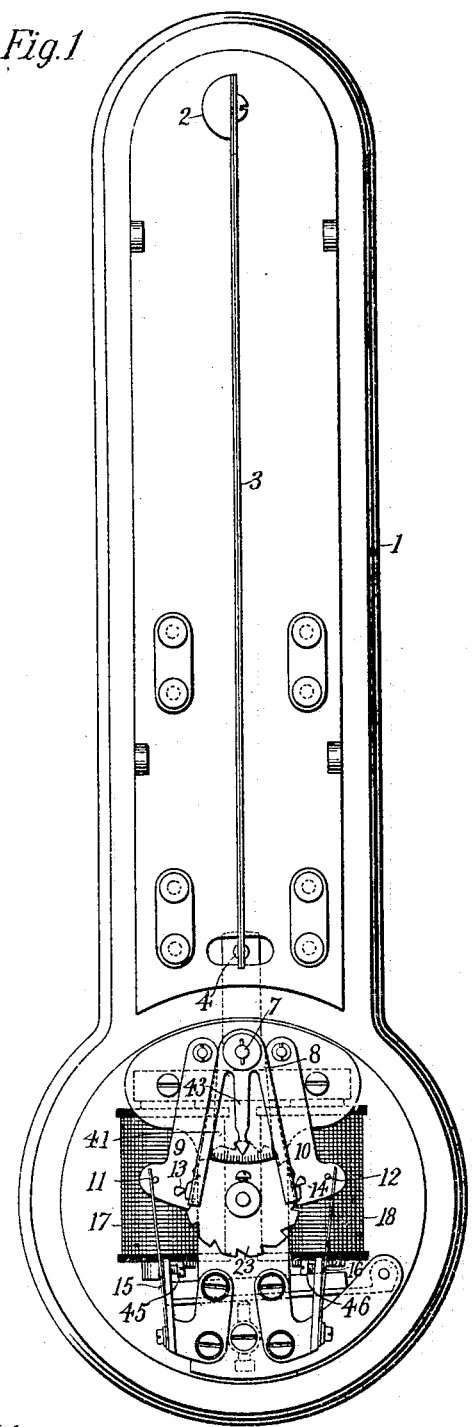

No. 766,469. PATENTED AUG. 2, 1904.
F. M. SCHMIDT.
SYSTEM FOR TEMPERATURE REGULATION.
APPLICATION FILED JAN. 7, 1903.
NO MODEL. 4 SHEETS—SHEET 1.

Witnesses:
Raphaël Netter
S. S. Dunham

Frederick M. Schmidt, Inventor
by Kerr, Page & Cooper, Attys

No. 766,469. PATENTED AUG. 2, 1904.
F. M. SCHMIDT.
SYSTEM FOR TEMPERATURE REGULATION.
APPLICATION FILED JAN. 7, 1903.
NO MODEL. 4 SHEETS—SHEET 2.

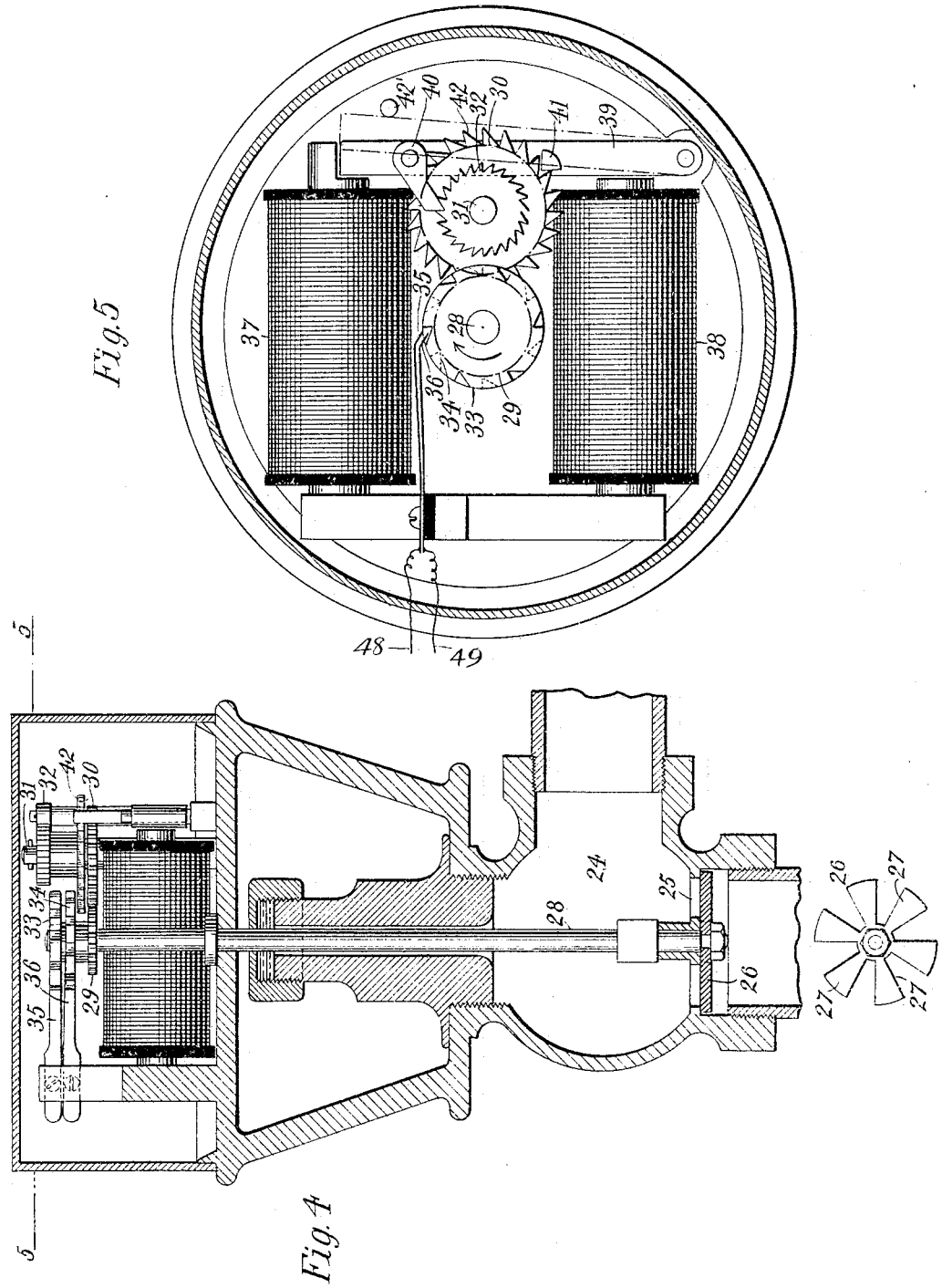

No. 766,469. PATENTED AUG. 2, 1904.
F. M. SCHMIDT.
SYSTEM FOR TEMPERATURE REGULATION.
APPLICATION FILED JAN. 7, 1903.
NO MODEL. 4 SHEETS—SHEET 4.

Witnesses:
Raphaël Netter
A. S. Dunham.

Frederick M. Schmidt, Inventor by Kerr, Page & Cooper, Att'ys

No. 766,469. Patented August 2, 1904.

UNITED STATES PATENT OFFICE.

FREDERICK M. SCHMIDT, OF NEW YORK, N. Y., ASSIGNOR OF TWO-THIRDS TO GEORGE C. GERMOND AND WILLIAM H. SPELMAN, OF BROOKLYN, NEW YORK.

SYSTEM FOR TEMPERATURE REGULATION.

SPECIFICATION forming part of Letters Patent No. 766,469, dated August 2, 1904.

Application filed January 7, 1903. Serial No. 138,154. (No model.)

*To all whom it may concern:*

Be it known that I, FREDERICK M. SCHMIDT, a citizen of the United States, residing at New York, county of Kings, and State of New York, have invented certain new and useful Improvements in Systems for Temperature Regulation, of which the following is a specification, reference being had to the drawings accompanying and forming part of the same.

The invention which is the subject of the present application pertains to systems for regulating the temperature of a room or building, in which a thermostatic bar by its contraction or expansion makes electrical contact, and so closes a circuit to actuate a valve or other mechanism, and thus open or close the source of heat. Numerous attempts have been made to accomplish this regulation, and some of the prior systems and devices have operated with a considerable degree of success. It is well known, however, that even the best of these devices possess certain defects. For example, from the nature of the use to which it is subjected it is necessary that the thermostatic bar be exposed to the air in the room in which it is located, and for this reason it is impossible to have the bar entirely so uninclosed without exposing likewise the delicate contact mechanism on which the operation of the system depends. The device of course becomes dusty and the points of contact so covered as to seriously impair or even prevent the working of the apparatus. If the contact-bearing part of the bar is covered by a protecting-casing, however, the same delicacy of operation is not obtainable, since a part of the bar is not at once affected by changes of temperature. Such defects and others it is the object of my invention to overcome, as well as to provide a simple device for operating the heat-controlling valve or damper when energized by the closing of the circuit at the thermostat.

To these ends it consists of a thermostatic bar adapted by its contraction and expansion to make an initial contact, and devices which thereafter complete the contact to energize the valve or damper-operating mechanism, whereby the bar is, in effect, relieved of its function after the initial contact, together with similar devices for opening and closing the valve or damper.

For a further and clearer understanding of the invention reference may be had to the accompanying drawings, showing an embodiment of the same which I have found to be efficient and comparatively inexpensive, wherein—

Figure 2:
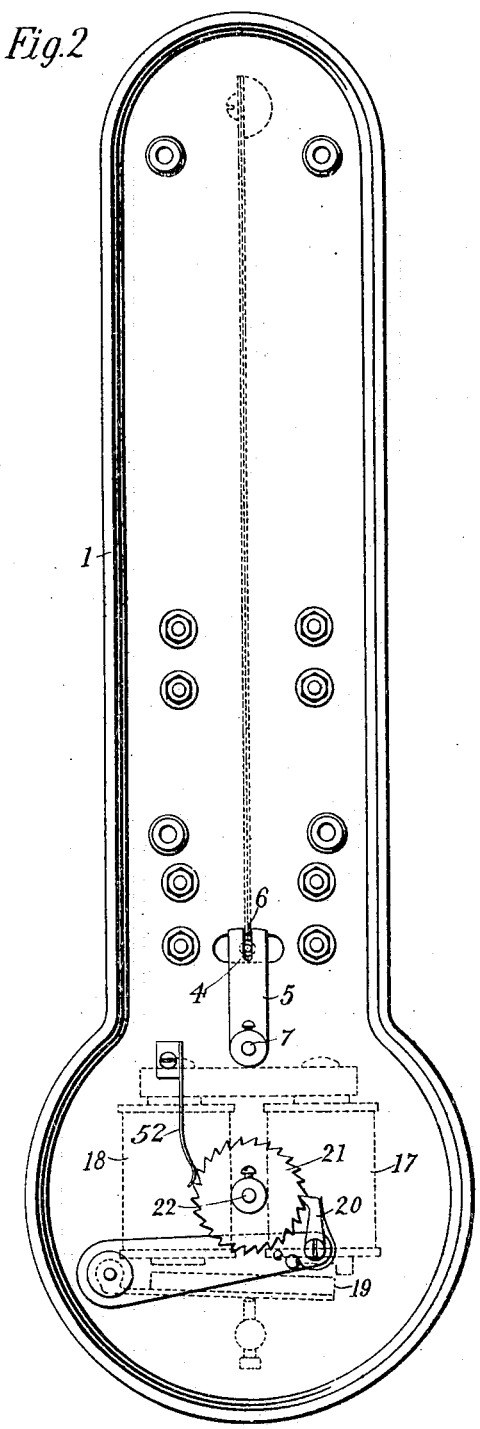
Figure 3:
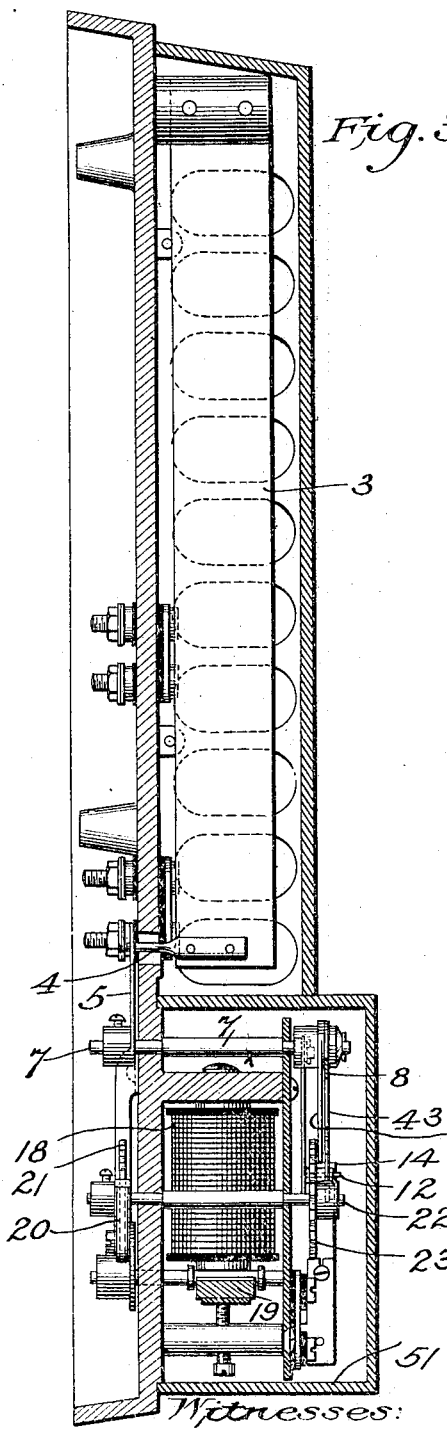
Figure 6:
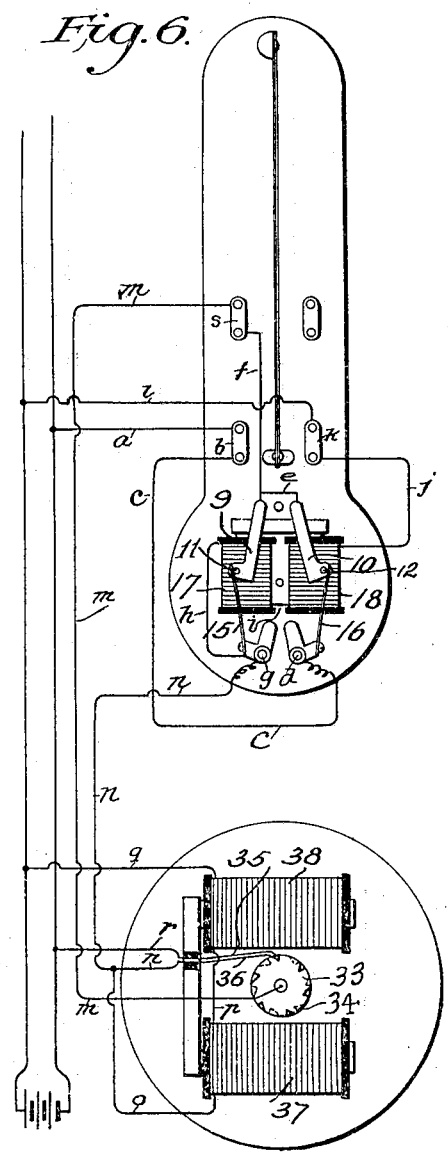

Figure 1 is a top plan view of the thermostat and circuit-closing mechanism. Fig. 2 is a bottom plan view of the same. Fig. 3 is a longitudinal section showing also the casings to protect the device. Fig. 4 is an elevation, partly in section, of the magnet mechanism employed with a steam-valve. Fig. 5 is a section on line 5 5 of Fig. 4, showing also the protecting-casing over the valve-operating devices. Fig. 6 is a diagram illustrating the wiring of the system. Figs. 7 to 10 are diagrammatic views showing different operative positions of the contact devices.

The operative elements of the circuit-closing part of the system are mounted on a suitable base 1, having means, as the stud 2, at its upper end for carrying a thermostatic bar 3, preferably made of two plates of dissimilar metals firmly fastened together, as shown, so that the expansion or contraction of the bar will produce flexure of the same in opposite directions, according as its temperature rises or falls. At the freely-movable end of the bar it engages, preferably by means of a pin 4, a lever 5, which has a slot 6 to receive said pin. The lever is rigidly secured to a rock-shaft 7, which at its other end carries with frictional engagement a forked device or lever 8. On each side of the latter are freely-swinging contact-carriers 9 10, having contact-pins 11 12, preferably of platinum, and ratchet-pins 13 14. Arranged in operative relation to the carriers are terminals 15 16, preferably of spring metal, bearing platinum contacts, against which the contact-pins may impinge.

An electromagnet having coils 17 18 is provided, so connected with the terminals and carriers that when contacts between the same are made the magnet will be energized. A freely-movable armature 19, preferably pivoted at one of its ends, as shown in Fig. 2, is arranged opposite the poles of the magnet and carries a pawl 20, which is adapted to engage a ratchet-wheel 21 on the shaft 22. On the other end of the last-mentioned shaft is a make-and-break device 23, Fig. 1, of a form similar to a ratchet, but having broad teeth, as shown, arranged in operative relation to the pins on the contact-carriers, as will be more fully explained hereinafter. The wheel 23 has only half as many teeth as the ratchet 21, (in the constrction shown the number on the latter being twenty-six,) so that a movement of the latter one tooth will turn the former a distance equal to one-half of one of its teeth, thereby bringing a notch and a tooth under the pins 13 14 alternately. A spring 52, Fig. 2, having no electrical connection with the system, bears against the ratchet 21 and acts as a drag to steady the action of the same.

Referring now to Figs. 4 and 5, which illustrate a convenient form of valve-operating mechanism, 24 is a valve controlling the admission of steam to a radiator, having a wall 25 and a valve-plate 26 of the star form shown, the wall having openings of corresponding shape, which may be covered or uncovered by the blades 27 of the valve-plate when the latter is rotated with the valve-shaft 28. On the other end of the shaft is a gear-wheel 29, meshing with a gear 30, which latter is arranged on a shaft 31, so as to be actuated by the ratchet 32. The valve-shaft also carries notched wheels 33 and 34 in electrical connection with each other, against which bear terminals or brushes 35 36, insulated from each other and the rest of the system. The brushes are in circuit with the valve-magnets, as shown in Fig. 6, through wires 48 and 49. A magnet having coils 37 38 is disposed adjacent the valve-shaft and other devices, with a pivoted armature 39, carrying a pawl 40 to engage the ratchet 32, and a pin 41, engaging with a toothed locking-disk 42, rotating on the shaft 31 with the ratchet 32. A banking-pin 42' is provided to limit the return of the armature. The gearing 29 30 is proportioned so that a single vibration of the armature, advancing the ratchet 32 to the extent of one tooth, will turn the valve-shaft 28 a distance equal to the angle between the blades of the valve-plate. In the construction shown in the drawings the ratchet requires twenty-four vibrations of the armature for a complete rotation, and the valve having six blades the gearing is so proportioned that one twenty-fourth of a revolution of the ratchet will turn the shaft 28 through thirty degrees, which is the angular width of a blade and also the angular distance between blades. In this manner a single vibration of the armature opens the valve to its fullest extent or closes it completely, as the case may be.

The wiring of the system is clearly shown in Fig. 6 and will be more fully explained in connection with the following detailed description of the operation of the invention.

Figure 7:
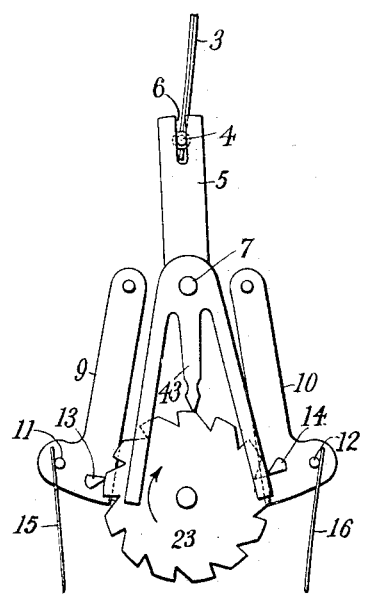
Figure 8:
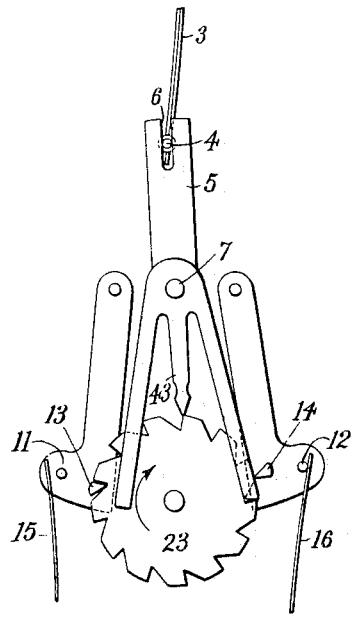
Figure 9:
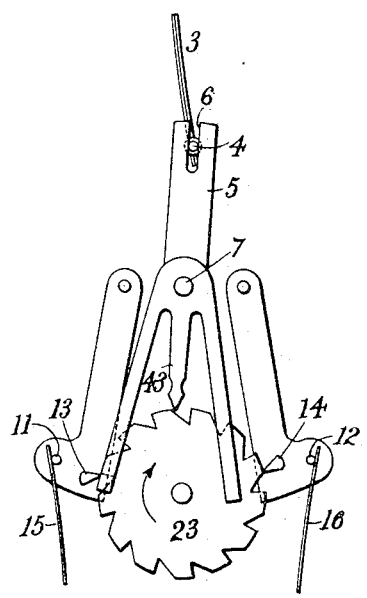
Figure 10:
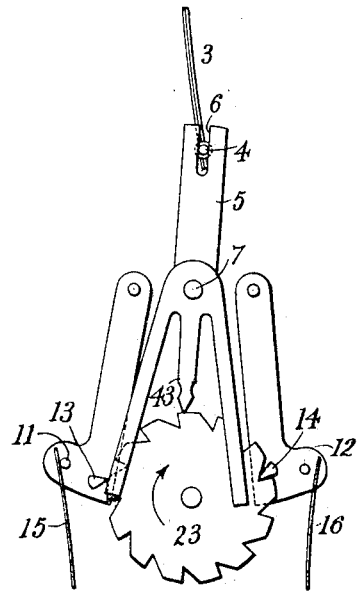

Let it be supposed that the temperature of the room in which the system is installed has risen and the thermostatic bar has therefore been flexed, assuming the position shown in Fig. 7. At this time both contact-pins are impinging on the terminal or brushes, and the current consequently flows through and energizes the magnet-coils. The armature is then attracted, and by the movement of the same the pawl 20 partially rotates the ratchet 21, Fig. 2, carrying with the latter the notched wheel 23. As the wheel 23 rotates in the direction of the arrow, Fig. 7, the pin 14, riding up on the broad surface of the approaching tooth, carries the contact-pin 12 with a rubbing or grinding friction firmly against the brush 16. The grinding of the terminal points at each energizing of the magnet serves to keep the surfaces clean and bright. It will now be seen that the thermostat, through the levers 5 and 8, has made an initial contact, which may be, if desirable or unavoidable, only very feeble; but the magnet, energized by such feeble initial contact, has taken up the work and forced the terminals firmly together, thus relieving the thermostat of its function and establishing a complete electrical connection through the brushes, (represented by 15 16, Fig. 6,) the carriers 9 10, the magnet-coils 17 18, and through the valve-magnet to actuate the valve mechanism, as will be more fully explained below. At the same time that the pin 14 is carried up on the tooth approaching it the tooth on which the pin 13 has been resting moves away until the following notch comes under the pin, which latter then drops into same, thus breaking the circuit. The wheel and coacting parts are now in the position of Fig. 8 and the valve closed. The temperature of the room soon begins to fall, and with it the bar contracts until bent in the opposite direction, as appears in Fig. 9. The initial contact is thus again made, the magnet energized, and the complete circuit established as before. Now, however, as the pawl 20 rotates the ratchet 21 the pin 13 rides up on the approaching tooth to carry the left-hand contact-pin 11 against the brush 15, while the pin 14, as its supporting-tooth moves away, falls into the approaching notch and breaks the contact. The valve-actuating devices by the contact just made were energized and the valve opened. After the circuit is broken the parts remain in the position of Fig. 10, the four Figs. 7, 8, 9, and 10 representing a complete cycle of operation. The next movement of the bar must be an expansion, which will bring the parts once more to the position of Fig. 7 and close the valve.

Since the instant of making the initial contact is dependent on the position of the lever 8, it is obvious that if this lever be set toward the pin 14, or whichever of the two makes the contact to close the valve, the bar need not contract to so great an extent as before to make the circuit. In other words, the valve will be closed at a lower temperature, and the temperature of the room will therefore be maintained at that point. On the other hand, if the lever 8 be set toward the other pin the valve will be closed at a higher temperature, which will be the point at which the room is maintained, as will be readily understood. To provide means for making such adjustments easily, I arrange adjacent to the pointer 43 a plate 44, Fig. 2, graduated on its lower edge, as shown in Fig. 1, rigidly mounted on the shaft 7 and bearing on the lever 8 with frictional contact of sufficient firmness to carry the latter with the plate when the same is swung to either side. As the person desiring to set the device moves the plate, however, the lever 8 encounters the resistance of the pins 13 and 14, and the friction between plate and lever being overcome the latter ceases to move while the former continues, thus bringing the graduations on the opposite side under the pointer 43. These graduations may be calibrated in the well-known way, so that by moving the plate until the division marked with the desired degree of temperature is directly under the pointer the system may be set to maintain that degree. The brushes may also be shifted to effect this adjustment, utilizing for this purpose the screws 45 46, as will be readily understood.

It will be understood that the contact-pins 11 12 are in series with the coils 17 18 through the carriers 9 10, so that both pins must be in contact with their respective brushes 15 16 to establish the local or initial circuit to energize the thermostat-magnets. This circuit is shown in Fig. 6.

Referring now to the valve devices, when the contact is made at the regulator, as above explained, the circuit thus made includes, as will be seen by reference to Fig. 6, the coils 37 38 of the valve-magnet. The armature 39 is therefore attracted and its pawl 40 pushes forward the ratchet 32 a distance equal to one tooth, thus rotating the valve-stem 28 and plate 26. As the shaft begins its rotation the contact 35 rides up on the approaching tooth of the toothed wheel 33, which, it will be remembered, rotates with the shaft. At the same time the lower wheel 34 has not progressed far enough to permit its brush 36 to fall into a notch, so that for an instant, or practically the entire period of the magnet's energization, both brushes are in contact with their wheels at the same time. In Fig. 6 the lower disk is shown in dotted lines, and referring to this figure for further understanding of the operation it will be seen, in Figs. 5 and 6, that by the rotation of the disks 33 34, whereby both brushes are in contact therewith, a circuit is made through the wires 48 49 and the magnets 37 38, with the result that the current no longer flows through the thermostat-magnets 17 18. The latter are thus cut out, and by the power-translating devices just described the energy has been transferred to the valve-operating mechanism alone. As the wheels 33 34 rotate still farther the approaching notch on the wheel 34 comes under the brush 36, which drops out of contact, thus breaking the circuit just established. The armature 39 then falls back to its first position against the banking-pin 42'. To prevent the ratchet 32 from turning too far, the locking-wheel 42, before described, engages the pawl-pin 41 and checks further movement of the armature when the latter has risen far enough to break the local circuit.

The devices for rotating the valve may be termed a "step-by-step mechanism" in that a complete rotation requires a number of vibrations of the armature and actuations of the ratchet; but in the preferred embodiment, as shown, only a single step or actuation is required to effect a complete opening or closing of the valve.

The course of the current through the wiring of the apparatus may be briefly described as follows, referring to Fig. 6: Suppose the thermostatic bar to have been flexed to the left and both pins 11 12 to be in contact with their brushes, as in Fig. 7, then the current will flow from battery through wire $a$, binding-plate and connector $b$, wire $c$, plate $d$, brush 16, pin 12, carrier 10, wire $e$, carrier 9, pin 11, brush 15, plate $g$, wire $h$, magnet 17, wire $i$, magnet 18, wire $j$, plate $k$, wire $l$ to battery, completing the local circuit of the thermostat, drawing up the armature and pressing the contacts firmly together. At the same time the current flows from the wire $e$ through connector $s$, wire $m$, ratchet 33, brush 36, (in contact with ratchet 33, brush 35 being out of contact,) wire $n$, wire $o$, magnet 37, wire $p$, magnet 38, wire $q$ to battery, completing the main circuit, effecting an initial energization of the valve-magnets, and rotating the ratchets until brush 35 is also in contact. The local circuit of the valve-magnets is thereby established, as follows: wire $r$, brush 35, ratchet 34, ratchet 33, brush 36, wire $n$, wire $o$, magnet 37, wire $p$, magnet 38, and wire $q$ to battery. As the ratchets rotate further the brush 36 drops into a notch, breaking the circuit at that point. Meantime the ratchet 23 at the thermostat has completed its movement and the carrier-pin 13 has fallen into a notch, breaking the thermostat-circuit at pin 11 and brush 15, as in Fig. 8. Upon flexure of the bar to the right, as in Fig. 9, bringing pin 11 and brush 15 once more into contact, the local circuit of the thermostat is again made, as described. At the same time the main circuit is established from battery through wire $r$, brush 35, ratchet 34, wire $m$, connector $s$, wire $f$, carrier 9, pin 11, brush 15, plate $g$, wire $n$, wire $o$, (brush 36 being out of contact with its ratchet,) magnet 37, wire $p$, magnet 38, wire $q$ to battery. The valve-ratchets are thereby rotated until brush 36 is again in contact, whereupon the valve local circuit is once more established, as before. Upon further rotation of ratchets 33, 34, and 23 the brush 35 drops into a notch, breaking circuit there, and carrier-pin 14 into a notch, breaking circuit at that point and leaving pin 11 in contact with brush 15, as in Fig. 10. A complete cycle of operations has thus been performed, and the apparatus is again ready for flexure of the bar to the left, as in Fig. 7.

It will be observed that no current can flow through the main circuit to initially energize the valve-magnets unless pin 12 is in contact with brush 16 and brush 36 with ratchet 33 simultaneously or pin 11 with brush 15 and brush 35 with ratchet 34 simultaneously. It should therefore be observed in setting up the apparatus that the parts are so arranged that after an energization has been completed the brush 36 is left out of contact with ratchet 33 whenever pin 12 is left in contact with brush 16 and that brush 35 is left out of contact with ratchet 34 whenever pin 11 is left in contact with brush 15. This arrangement may be effected by adjusting the ratchets 33 and 34 on the valve-stem 28 or by reversing the wire connections to the brushes 35 and 36, whichever is more convenient under the circumstances.

The wiring here described is of course typical merely and may be varied as suits the expert who applies the invention without departing from the proper scope of the invention.

The advantages obtained by the use of power-translating devices whereby the making of the circuit is progressively shifted from the thermostat to the thermostat-magnet and from the latter to the valve-operating mechanism are apparent. The energy of the expansion or contraction of the thermostat may be very slight, and for that reason the contact may be very feeble; but this is at once strengthened and the bar relieved by the magnets 17 18, the contact now certainly being strong enough to energize the valve-magnets. These at once raise their armature and establish their own local circuit, so that the comparatively minute electric energy a part of which was at first expended in the thermostat-coils is now wholly utilized at the valve. In this manner the extremely-delicate movement of the bar is magnified to insure the complete immediate actuation of the valve.

The employment of the devices between the thermostat and the carriers 9 10 to transmit the movement of the former to the latter enables me to inclose the contact-making instrumentalities in a dust-proof and air-tight casing composed of the back plate 1, on which are mounted the electromagnets and a cap 51, thus completely protecting the sensitive mechanism, while at the same time leaving the entire thermostatic bar exposed to the air. The back plate 1 constitutes the rear wall of the casing, and the opening through which the rock-shaft 7 extends provides a bearing therefor. By this arrangement the thermostat is affected in all its parts by changes of temperature, and the delicacy of the system's operation is greatly increased. I am not aware that the simultaneous inclosing of the contacts and exposing of the entire bar have ever before been successfully accomplished. Furthermore, the delicacy of operation is increased by the method of making contact before described, since the contact-surfaces are kept constantly clean and bright by the firm rubbing and grinding incident to each energization of the magnets.

The cost of installing and maintaining my invention has been found considerably less than any electric or pneumatic system with which I am familiar. In a building wherein electric lights are used the wiring of the system is practically *nil*, since all the rooms being provided with outlet-boxes for a light-fixture of some kind a tap can readily be made therefrom to operate both the thermostat and the valve mechanism, using an artificial resistance to reduce the current and voltage. The time consumed in each operation of the system is approximately one-fourth of a second and the current one-fourth of an ampere. Assuming that the temperature in a room changes fifty times in twenty-four hours, (an excessive estimate,) the total current consumed is only six and one-fourth ampere-seconds. From this statement it will be seen that the power consumption is very low.

Other advantages will at once suggest themselves to the expert, and I therefore need not make special mention of them. It is obvious, of course, that the particular devices which I have illustrated and described represent merely one embodiment of my idea. The invention itself is capable of a wide variation in its embodying structures. For example, an efficient system might be made in which the second transference of the contact-making function—namely, from thermostat-magnets to valve mechanism, so that the latter is actuated solely from or by the former—is omitted; but such a system would be clearly within the scope of my invention, broadly considered, and it should be further understood, of course, that the term "thermostat" or "thermostatic device" as used in the claims is intended to designate not only a contractible or expansible bar, as specifically illustrated, but also any device equivalent thereto.

What I claim is—

1. In a system for temperature regulation, the combination with means for controlling a source of heat; of a thermostat; an electromagnet; a pair of terminals; independently-movable contacts adjacent the terminals, adapted to form a circuit with the electromagnet, both terminals, and a source of electric current; mechanism intermediate the thermostat and the contacts whereby the movement of the thermostat causes one or the other of the contacts and its adjacent terminal to impinge; and means to actuate the heat-controlling means; as set forth.

2. In a system for temperature regulation, the combination with means for controlling a source of heat, of electromagnetic devices to directly actuate such means, a main circuit including the electromagnetic devices, a thermostat for closing the main circuit to initially energize the electromagnetic devices, a local circuit for said devices, a pair of contact-wheels in electrical connection with each other in the local circuit, a pair of brushes in the local circuit adapted to bear on the contact-wheels to complete the local circuit, and means actuated by the electromagnetic devices to throw one or the other of said brushes out of contact with its wheel to break the local circuit when the source of heat has been controlled, as set forth.

3. In a system for temperature regulation, the combination with means for controlling a source of heat, and devices for actuating such means, of a thermostat, an electromagnet, contacts in circuit therewith and with a source of electric current, adapted to be closed by the movement of the thermostat to effect an initial energization of said electromagnet, means actuated by the electromagnet to press the contacts firmly together, and means actuated by the same electromagnet to break the circuit, as set forth.

4. In a system for temperature regulation, the combination with means for controlling a source of heat, and electromagnetic devices to actuate such means, of a thermostat, an electromagnet, contacts in circuit therewith and with a source of electric current, adapted to be closed by the movement of the thermostat to energize the electromagnet, means whereby the energization of said electromagnet energizes the electromagnetic devices to actuate said heat-controlling means, and mechanism actuated by the electromagnet to break the circuit established by closing the contacts, as set forth.

5. In a system for temperature regulation, the combination with means for controlling a source of heat, of electromagnetic devices to directly actuate such means, a main circuit including the electromagnetic devices, a thermostat for closing the main circuit to initially energize the electromagnetic devices, a local circuit for the said devices, a pair of toothed wheels electrically connected with each other in the local circuit, rotatable on the same axis and arranged with the teeth of one in staggered relation to those of the other, a pair of brushes in the local circuit, adapted to bear each on its adjacent wheel, one or the other of said brushes being normally out of contact with its wheel and one normally in contact with its wheel, and means for effecting a partial rotation of the wheels, whereby the out-of-contact brush will be caused to engage a tooth on its wheel to momentarily complete the local circuit and the other brush caused to be disengaged from its wheel to break the local circuit after the source of heat has been controlled, as set forth.

6. In a system for temperature regulation, the combination with a thermostat, normally separated electrical contacts, and normally impinging electrical contacts, of a lever system intermediate the thermostat and the contacts, whereby the movement of the thermostat causes the normally separated contacts to impinge, an electromagnet in circuit with all of said contacts, and means for separating the normally impinging contacts after the normally separated contacts have been brought together, as set forth.

7. In a system for temperature regulation, the combination with a thermostat, of a brush, a contact normally impinging thereon, a second brush, a second contact normally separated therefrom, mechanism intermediate the thermostat and the contacts whereby the movement of the thermostat causes the second contact to impinge on the second brush, and electromagnetic heat-controlling devices in circuit with said brushes and said contacts, as set forth.

8. In a system for temperature regulation, the combination with a thermostat, of a brush, a contact normally impinging thereon, a second brush, a second contact normally separated therefrom, electromagnetic heat-controlling devices electrically connected with said brushes and said contacts, mechanism intermediate the thermostat and the contacts whereby the movement of the thermostat causes the second contact to impinge on the second brush to initially energize the electromagnetic devices, and means actuated by said devices to press said second contact firmly against its brush, as set forth.

9. In a system for temperature regulation, the combination with a thermostat, of a brush, a contact normally impinging thereon, a second brush, a second contact normally separated therefrom, mechanism intermediate the thermostat and the contacts whereby the movement of the thermostat causes the second contact to impinge on the second brush, electromagnetic heat-controlling devices in circuit with said brushes and said contacts, and means actuated by said electromagnetic devices to separate the first contact and brush, and to leave the second contact impinging on its brush, as set forth.

10. In a system for temperature regulation, the combination with a thermostat, of a pair of brushes, a pair of movable contacts between said brushes, one of said contacts normally impinging on its adjacent brush, a lever between said contacts arranged to press the other contact against its brush when the thermostat is actuated, and electromagnetic heat-controlling devices in circuit with said brushes and said contacts, as set forth.

11. In a system for temperature regulation, the combination with a thermostat, of a lever system, a pair of movable contacts in operative relation to said lever system, a brush against which one of said contacts normally impinges, a second brush, electromagnetic devices in circuit with said contacts and brushes, a movable armature, a ratchet-wheel, and a pawl carried by said armature and arranged to rotate said ratchet, as and for the purposes set forth.

12. In a system for temperature regulation, the combination with devices for controlling a source of heat, of an electromagnet in circuit with a source of electric current, normally separated contacts in said circuit, a movable armature, means actuated by said armature to operate the heat-controlling devices, means for initially energizing said electromagnet, means actuated by the armature for closing the contacts to complete the energization of the electromagnet, and for breaking the circuit when the heat-controlling devices have been operated, as set forth.

13. In a system for temperature regulation, the combination with a rigidly-mounted thermostat, and normally separated electrical contacts, of mechanism intermediate the contacts and the thermostat, actuated by the latter to cause the contact to impinge, and adjustable independently of the thermostat, whereby the said mechanism may be set farther from or toward engagement with the contacts to necessitate a correspondingly greater or less movement of the thermostat to close the contacts, as set forth.

14. In a system for temperature regulation, the combination with a rigidly-mounted thermostat, and normally separated electrical contacts, of a lever intermediate the contacts and the thermostat, actuated by the latter to press one contact against the other, and adjustable independently of the thermostat, whereby the lever may be set farther from or toward engagement with the contact to necessitate a correspondingly greater or less movement of the thermostat to close the contacts, as set forth.

15. In a system for temperature regulation, the combination with a rigidly-mounted thermostat, and normally separated electrical contacts, of a lever intermediate the contacts and the thermostat, actuated by the latter to press one contact against the other, and adjustable independently of the thermostat, a pointer carried by said lever, and a graduated plate adjacent the pointer, as set forth.

16. In a system for temperature regulation, the combination with a thermostat, a pair of brushes, contacts arranged between said brushes and adapted to impinge thereon, a forked lever mounted between the contacts adapted to be actuated by the thermostat to engage the contacts alternately to press one or the other against its adjacent brush, said forked lever being adjustable independently of the thermostat, a pointer carried by the lever, and a graduated plate adjacent the pointer, as set forth.

17. In a system for temperature regulation, in combination, a dust-proof casing, normally separated electrical contacts inside the casing, electromagnetic devices in circuit with the contacts, a thermostat outside the casing, and mechanism extending from the contacts through a bearing in the wall of the casing to engagement with the thermostat, whereby movement of the thermostat will actuate the mechanism and press the inclosed contacts together, as set forth.

FREDERICK M. SCHMIDT.

Witnesses:
  T. H. WISE,
  FRANK SPRINGER.